United States Patent [19]

Ribka et al.

[11] 4,252,530
[45] Feb. 24, 1981

[54] PROCESS FOR DYEING AND PRINTING SYNTHETIC HYDROPHOBIC FIBER MATERIAL

[75] Inventors: Joachim Ribka, Offenbach am Main; Horst Tappe, Dietzenbach; Kurt Roth, Hofheim; Hans-Jürgen Weyer, Frankfurt am Main, all of Fed. Rep. of Germany

[73] Assignee: Cassella Aktiengesellschaft, Frankfurt am Main, Fed. Rep. of Germany

[21] Appl. No.: 66,432

[22] Filed: Aug. 14, 1979

[30] Foreign Application Priority Data

Aug. 19, 1978 [DE] Fed. Rep. of Germany ......... 283639

[51] Int. Cl.$^3$ .............................................. D06P 5/12
[52] U.S. Cl. ........................................ 8/457; 8/662
[58] Field of Search ................... 8/41 R, 69, 457, 662

[56] References Cited

U.S. PATENT DOCUMENTS

| | | | |
|---|---|---|---|
| 2,659,719 | 11/1953 | Dickey et al. | 548/191 |
| 2,683,708 | 7/1954 | Dickey et al. | 548/191 |

Primary Examiner—A. Lionel Clingman
Attorney, Agent, or Firm—Connolly and Hutz

[57] ABSTRACT

White patterns on synthetic fiber textiles or patterns of a different color on a colored background are produced by dyeing the material with a dyestuff dischargeable to white, drying the material, printing the material with a discharge resist paste and heating the treated material to 100°–230° C. wherein the discharge agent is a base which produces a pH of at least 8 in a 5% strength aqueous solution.

8 Claims, No Drawings

PROCESS FOR DYEING AND PRINTING SYNTHETIC HYDROPHOBIC FIBER MATERIAL

The present invention relates to a process for the production of discharge resist prints on textile materials, in particular textile materials which contain a predominant proportion of hydrophobic fibres, preferably polyester fibres, or which consist of such fibres, by impregnating the materials with dye liquors which contain dyestuffs which are dischargeable to white and in some cases dyestuffs which are resistant to discharge agents, in addition to customary dyeing and padding auxiliaries, and drying or superficially drying the padded materials and then printing them with a discharge resist paste which, if desired, also contains dyestuffs which are resistant to discharge agents, as well as the discharge agent, and then subjecting the materials to heat treatment at temperatures of 100° to 230° C., the dyestuffs characterised by the formula I below being employed as the dyestuffs which are dischargeable to white and a base giving a pH as stated below being employed as the discharge agent.

In the field of textile printing, producing white or coloured sharply outlined patterns on a dark-coloured background has always been a problem. In particular, direct printing of the textile material is completely useless if production of a filigree-like pattern on a dark background is desired. It has been known for a long time that such designs are produced by printing a discharge paste in the desired pattern onto a dark background dyeing produced with a dyestuff which is dischargeable to white and then destroying the dyestuff at the points printed with the discharge paste, by a dry or wet heat treatment. After washing off the resulting prints, the desired pattern in white on a dark ground is obtained. The addition of dyestuffs which are resistant to the discharge agent to the discharge printing pastes is also already known. In this case, the textile material is dyed by the indestructible dyestuff at the printed points at the same time as the ground dyeing is destroyed. Coloured prints on a dark ground are obtained in this case. Coloured prints on a dark ground can also be obtained if the dark ground is produced with a mixture of a dischargeable dyestuff and a non-dischargeable dyestuff of a different colour by introducing both types of dyestuff into the padding liquor.

When these known processes are applied to synthetic fibre materials or textile materials, which preferably consist of hydrophobic synthetic fibres, there is a problem inasmuch as the discharge of, for example, polyester fibres dyed with disperse dyestuffs is very difficult. Disperse dyestuffs once fixed in the polyester fibre, that is to say dissolved, are largely removed from attack by aqueous agents, and thus also from attack by aqueous discharge pastes. When discharge prints are produced on textile materials containing hydrophobic fibres or consisting of hydrophobic fibres, the known discharge printing process is thus modified by first padding the textile material with a dye liquor containing a disperse dyestuff and drying or superficially drying the material, during which, however, no fixing of the dyestuff, that is to say solution of the dyestuff in the hydrophobic fibre, should take place. The desired pattern is then printed onto the dried or superficially dried padded fabric with the discharge printing paste and the padded and printed fabric is subsequently subjected to a heat treatment, during which the ground dyestuff migrates into the polyester at the non-printed points, that is to say is fixed, and at the same time the dyestuff is destroyed at the printed points, that is to say no dyeing is effected. In view of this mechanism, this process is also called discharge resist printing.

The discharge resist printing process, which is in itself simple, has a number of industrial difficulties which frequently impede its use. Thus, as a rule, it is not easy to destroy the ground dyestuff, without trace, by the discharge agent. If this operation is not successful, there remains on the discharged points a coloured residue, the shade of which can vary between yellow-brown and dull violet or reddish-tinged grey hues and which stains the white ground at the discharged points. This leads to white discharges which appear dirty or, in the case where a coloured discharge is to be produced, to adulteration of the shade of the dyestuff which is resistant to discharge agents. In order to overcome this difficulty, discharge pastes which contain relatively powerful reducing agents or oxidising agents, such as, for example, sodium dithionite together with an alkali, alkali metal formaldehyde-sulphoxylates or even heavy metal salts, such as, for example, tin-II chloride, are used. It is indeed as a rule possible to achieve a perfect white discharge print with strong discharge agents of this type, but the fibre material is frequently damaged, especially if the polyester fibre also contains accompanying fibres, such as, for example, cellulose fibres. Furthermore, these discharge agents are as a rule not cheap, and in the case of the heavy metal discharge agents they represent an additional ecological pollution or cause additional expenditure in the purification of the effluents. Moreover, there are only relatively few types of dyestuffs which are resistant to such discharge agents, and thus the selection of dyestuffs which are resistant to discharge agents and can be used for the production of coloured discharges is relatively small.

Disperse dyestuffs which can be discharged to pure white with agents having as mild an action as possible are required for the background dyeing in order to overcome these difficulties. Disperse dyestuffs which contain at least 2 esterified carboxyl groups in the molecule are known from German Documents open for Inspection Nos. 2,612,740, 2,612,741, 2,612,742, 2,612,790, 2,612,791 and 2,612,792. When treated with aqueous alkalis, such dyestuffs are saponified and dyestuffs which are soluble in alkali and contain carboxyl groups are formed. The use of such dyestuffs as disperse dyestuffs for dyeing polyester materials has the advantage that nonfixed dyestuff residues can be washed out of the textile material by simple treatment with agents having an alkaline action. It is also already known that non-fixed dyestuff residues can easily be removed from dyeings with disperse dyestuffs which contain pyridone derivatives as the coupling component by treating the fibre with alkali. However, these dyestuffs which are soluble in aqueous alkali have the disadvantage that, as regards pyridone dyestuffs, they can essentially be employed exclusively for yellow or reddish-tinged yellow shades, and, as regards dyestuffs with esterified carboxyl groups, they have a certain affinity for hydrophilic fibres, such as, for example, wool, cotton or polyamide fibres, after saponification of the ester groups and dye or stain these fibres. In addition, the diazo components and coupling components required for the manufacture of dyestuffs containing carboxylic acid ester groups are not customary substances in the large-scale chemical industry but must be manufactured separately for these types of dyestuffs, and this is as a rule uneconomically expensive. The need to use disperse dyestuffs which are dischargeable to pure white under relatively mild discharge conditions in the discharge resist printing process on hydrophobic textile materials could not therefore be satisfied by the abovementioned types of dyestuff.

It has now been found, surprisingly, that the difficulties in carrying out discharge resist printing on textile materials which consist entirely or predominantly of hydrophobic synthetic fibres can be overcome if these materials are impregnated in a manner which is in itself known with dye liquors which contain dyestuffs which are dischargeable to white and in some cases dyestuffs which are resistant to discharge agents, in addition to customary dyeing and padding auxiliaries, and the impregnated fabric is dried or superficially dried and then printed in the desired pattern with a discharge resist paste which, if desired, also contains a dyestuff which is resistant to discharge agents, in addition to the discharge agent, and if the dyestuffs which are dischargeable to white used are those of the formula I

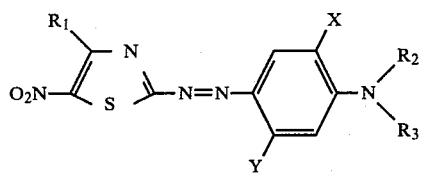

wherein $R_1$ denotes hydrogen, alkyl with 1 to 6 C atoms, cyano, trifluoromethyl or a phenyl radical, which can be substituted by a substituent from the group comprising chlorine, bromine, nitro and alkyl with 1 to 4 C atoms; X denotes hydrogen, chlorine, bromine, alkyl with 1 to 4 C atoms which is optionally substituted by a substituent from the group comprising chlorine, bromine, cyano and hydroxyl, alkoxy with 1 to 4 C atoms, hydroxyalkoxy with 2 to 4 C atoms or alkoxyalkoxy with a total of 3 to 6 C atoms; Y denotes hydrogen, chlorine, bromine, alkyl with 1 to 4 C atoms which is optionally substituted by a substituent from the group comprising chlorine, bromine, cyano and hydroxyl, alkoxy with 1 to 4 C atoms, hydroxy-alkoxy with 2 to 4 C atoms, alkoxyalkoxy with a total of 3 to 6 C atoms or NH—CO—Z, wherein Z represents alkyl with 1 to 4 C atoms, it being possible for the alkyl radical to be optionally substituted with a substituent from the group comprising phenyl, chlorine, bromine, cyano, hydroxyl, alkoxy with 1 to 2 C atoms and phenoxy, phenyl, amino or N-alkylamino with 1 to 4 C atoms; $R_2$ denotes hydrogen, alkyl with 1–6 C atoms which is optionally substituted by chlorine, bromine, cyano, hydroxyl, alkoxy or hydroxyalkoxy with 1 to 4 C atoms, phenyl, alkanoyloxy with 2–4 C atoms, alkylaminocarbonyloxy with 2–4 C atoms or phenylaminocarbonyloxy, or alkenyl with 3–6 C atoms; and $R_3$ denotes alkyl with 1 to 6 C atoms which is optionally substituted by chlorine, bromine, cyano, hydroxyl, alkoxy or hydroxyalkoxy with 1–4 C atoms, phenyl, alkanoyloxy with 2 to 4 C atoms or alkylaminocarbonyloxy with 2 to 4 C atoms, alkenyl with 3 to 6 C atoms or phenyl and, if $R_2$ is hydrogen, also the group —C(CH$_3$)$_2$—COOR$_4$, wherein $R_4$ is alkyl with 4 to 8 C atoms or methoxyalkyl, ethoxyalkyl or propoxyalkyl with a total of 4 to 8 C atoms, and the discharge agent used is a base which gives rise to a pH value of at least 8 in a 5% strength aqueous solution.

Examples of alkyl radicals with 1 to 6 C atoms which $R_1$ can represent are methyl; ethyl; propyl; isopropyl; butyl; 1- and 2-isobutyl; pent-1-yl, -2-yl and -3-yl; 2-or 3-methylbut-1-yl or -2-yl; hex-1-yl, -2-yl or -3-yl; 1-, 2- or 3-ethylbut-1-yl or -2-yl; and 2-, 3- or 4-methylpent-1-yl.

Examples of substituents which X can represent in the formula I are: chlorine or bromine; ethyl; methyl; propyl; isopropyl; but-1-yl or -2-yl; isobutyl; β-chloro-, -bromo-, -cyano- or -hydroxy-ethyl; β-chloro-, -bromo-, -cyano- or -hydroxy-propyl; γ-chloro-, -bromo-, -cyano- or -hydroxy-propyl; β- or γ-chloro-, -bromo-, -cyano- or -hydroxy-but-1-yl; 3-chloro-, -bromo-, -cyano- or -hydroxy-but-2-yl; methoxy, ethoxy, propoxy or isopropoxy; but-1- or -2-oxy; isobutoxy; β-hydroxyethoxy; β- or γ-hydroxypropoxy; hydroxyisopropoxy; β-, γ- or δ-hydroxybutoxy; hydroxyisobutoxy; β-methoxyethoxy; β-ethoxyethoxy; β-propoxyethoxy; β-butoxyethoxy; β- or γ-propoxypropoxy; and β-, γ- or δ-methoxy- or -ethoxy-butoxy.

Examples of substituents which Y can represent are: methyl; ethyl; prop-1-yl or -2-yl; n-but-1-yl or -2-yl; isobut-1-yl or -2-yl; 2-chloroethyl; 2-chloropropyl; 3-chloropropyl; 2-bromoethyl; 2-cyanoethyl; 2-cyanopropyl; 3-cyanopropyl; 1- or 2-hydroxyethyl; 2- or 3-hydroxyprop-1-yl; methoxy; ethoxy; propoxy; isopropoxy; butoxy; isobutoxy; β-hydroxyethoxy; 2- or 3-hydroxypropoxy; 2- or 4-hydroxybut-2-oxy; methoxyethoxy; ethoxymethoxy; 2- or 3-methoxy-prop-1-oxy; 2- or 3-ethoxyprop-1-oxy; 2- or 4-methoxybut-1-oxy; 2- or 4-ethoxybut-1-oxy; 4-methoxy- or -ethoxy-but-2-oxy; 1- or 2-methoxy- or -ethoxy-but-2-oxy; acetylamino; propionylamino; butyrylamino; phenacetylamino; chloro-, bromo-, cyano- or hydroxy-acetylamino; 2- or 3-chloro- or -bromo-propionylamino; 2- or 3-hydroxypropionylamino; 2- or 3-cyanopropionylamino; 2- , 3- or 4-chloro- or -bromo-butyrylamino; 2-, 3- or 4-cyanobutyrylamino; 2-, 3- or 4-hydroxybutyrylamino; methoxyacetylamino; 2- or 3-methoxy- or -ethoxy-propionylamino; 2-, 3- or 4-methoxybutyrylamino; phenoxyacetylamino; benzoylamino; aminocarbonylamino; methyl-, ethyl-, propyl- or butylaminocarbonylamino; isopropylamino-carbonylamino; and iso- or sec.-butylaminocarbonylamino.

Examples of optionally substituted lower alkyl groups with 1–6 C atoms which $R_2$ or $R_3$ represent are: methyl, ethyl, propyl, isopropyl, butyl, isobutyl, sec.-butyl pent-1-yl, -2-yl or -3-yl, hex-1-yl, -2-yl or -3-yl, 2-chloro-, -bromo- or -cyano-ethyl, 2- or 3-chloro-, -bromo- or -cyano-prop-1-yl; 2-, 3- or 4-chloro-, -bromo- or -cyano-but-1-yl; 1-, 3- or 4-chloro-, -bromo- or -cyano-but-2-yl; methoxy-, ethoxy-, propoxy-, isopropoxy- or butoxy-ethyl; β-(β-hydroxyethoxy)-ethyl; 2- or 3-methoxy- or -ethoxy-prop-1-yl; benzyl; phenethyl; phenylpropyl; acetoxy-, propionyloxy- or butyryloxy-ethyl; 2- or 3-acetoxy-, -propionyloxy- or -butyryloxy-prop-1-yl; 2-, 3- or 4-acetoxy-but-1-yl; phenoxyacetoxy-ethyl, -propyl or -butyl; methyl-, ethyl-, propyl-, butyl- or phenyl-aminocarbonyloxyeth-2-yl or -3-yl; methyl- , ethyl-, propyl- or butyl-aminocarbonyloxy-prop-1-yl or -but-1-yl; 2-hydroxyethyl; 2- or 3-hydroxyprop-1-yl; 3-hydroxyprop-2-yl; 2-, 3- or 4-hydroxybut-1-yl; and 1-, 3- or 4-hydroxybut-2-yl.

Examples of alkenyl groups which $R_2$ or $R_3$ represent are: allyl; methallyl; crotyl; but-3-en-1-yl; but-3-en-2-yl;

pent-2-, -3- or -4-en-1-yl; pent-3- or -4-en-2-yl; and hex-2-, -3-, -4- or -5-en-1-yl.

Examples of alkyl and alkoxyalkyl groups which $R_4$ can represent are: methyl; ethyl; propyl; isopropyl; n-butyl; sec.-butyl; isobutyl; pentyl; hexyl; 2-ethylhex-1-yl; methoxy-, ethoxy- or propoxy-ethyl; 2- or 3-methoxy-, -ethoxy- or -propoxy-prop-1-yl; 2-, 3- or 4-methoxy-, -ethoxy- or -propoxy-but-1-yl; 1-, 3- or 4-methoxy-, -ethoxy- or -propoxy-but-2-yl; and methoxy-, ethoxy- or propoxypentyl; and ethoxyhexyl.

A large number of bases which the discharge resist printing paste can contain as the discharge agent and which give rise to a pH value of at least 8 in a 5% strength aqueous solution are known. Examples of such bases are the hydroxides of the alkali metals and alkaline earth metals, salts of alkaline earth metals and alkali metals with weak organic or inorganic acids, ammonia or aliphatic amines, such as, for example, triethyl-, tripropyl- or tributyl-amine, ethanolamine, dimethyl- or diethyl-ethanolamine, diethanolamine, methyl-, ethyl- or propyl-diethanolamine or triethanolamine. Alkaline earth metal hydroxides, such as, for example, calcium hydroxide, alkali metal hydroxides, such as, for example, sodium hydroxide or potassium hydroxide, or alkali metal salts with weak inorganic acids, such as, for example, an alkali metal carbonate or tri-alkali metal phosphate, are usually employed as the bases. Sodium hydroxide or potassium hydroxide, sodium carbonate or potassium carbonate or sodium bicarbonate or potassium bicarbonate is preferably used as the base in the discharge resist printing paste.

Dyestuffs of the formula I in which $R_1$ is hydrogen are preferably used in the process according to the invention. Another preferred group of dyestuffs of the formula I comprises those dyestuffs which contain hydroxyl groups in the radicals $R_2$ and/or $R_3$, in particular those in which $R_2$ is ethyl or β-hydroxyethyl and $R_3$ is β-hydroxyethyl or those in which $R_2$ is hydrogen and $R_3$ is an alkoxycarbonylalkyl radical, in particular a 2-alkoxycarbonylprop-2-yl radical.

Another class of disperse monoazo dyestuffs preferably used according to the invention are the dyestuffs of the formula I

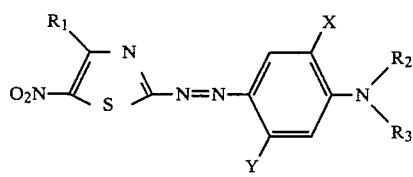

wherein X represents hydrogen, alkyl with 1–4 C atoms, alkoxyalkyl with a total of 3 to 6 C atoms, hydroxyalkyl with 2–4 C atoms or chlorine; Y represents chlorine, alkyl with 1–4 C atoms or —NH—CO—Z; and $R_1$, $R_2$, $R_3$ and Z have the abovementioned meanings.

Preferred —NH—COZ groups are alkanoylamino groups with an unsubstituted alkanoyl radical with 2 to 4 C atoms, in particular acetylamino groups.

Dyestuffs which are particularly preferably used in the process according to the invention are those which have a combination of preferred characteristics, such as, for example, dyestuffs of the formula IV

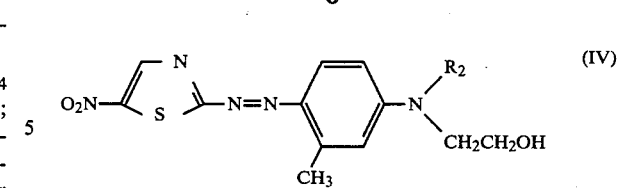

wherein $R_2$ is ethyl or β-hydroxyethyl, or dyestuffs of the formulae

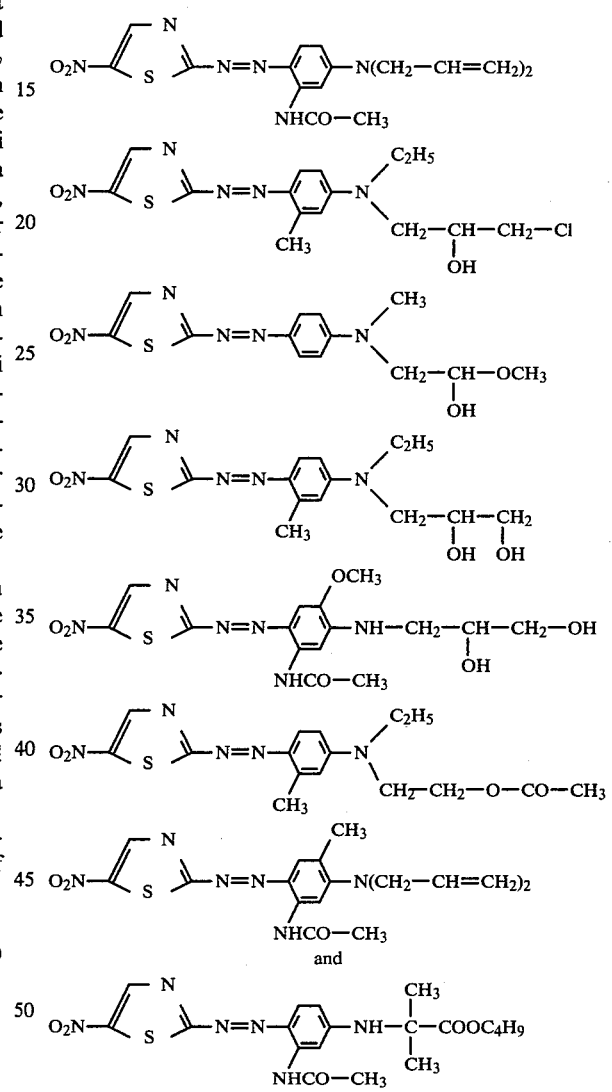

and

The process according to the invention can be carried out in a manner which is in itself known by padding the textile materials with dye liquors which contain one or more dyestuffs of the formula I, in addition to the known usual dyeing auxiliaries, such as, for example, dispersing agents, wetting agents and anti-foam agents, and padding auxiliaries, and squeezing off the padded fabric webs to a liquor pick-up of 50 to 120%. The fabric webs can be dried by warm air, preceded by infra-red radiation if necessary, at a temperature of about 80° to at most about 150° C., the time being correspondingly shortened. The fabric webs thus prepared are then printed with a discharge resist printing paste which contains one of the bases described above in more detail as the discharge agent and the known additives usual in printing pastes for textile printing, in particular thickeners. The padded and printed fabric webs are then subjected to heat treatment at between 100° and 230° C. In the lower temperature range from about 100° to 190° C., heat is preferably supplied by superheated steam. Hot air is preferably used as the heat transfer medium for heat treatments which are carried out at between 160° and 230° C. After the heat treatment, which results in fixing of the disperse dyestuffs and destruction of the dyestuffs of the formula I at the points printed with the discharge resist printing paste, the textiles can be after-treated in the manner usual for polyesters, rinsed hot and cold and dried. In a particular embodiment of the process according to the invention, the padding liquor also contains, in addition to dyestuffs of the formula I, dyestuffs which are resistant to alkali and thus are not destroyed by the alkaline discharge resist printing pastes to be employed according to the invention. If the procedure followed is otherwise as indicated above, multi-coloured designs are obtained. In a further embodiment of the process according to the invention, the dyestuffs of the formula I are not applied to the entire fabric by padding with a padding liquor, but are printed onto the fabric, also in the form of printing pastes, and the fabric is then overprinted with the discharge resist printing paste. The textile prints are then fixed and finished as already described above. In this process also, it is possible to add dyestuffs which are resistant to alkali to the coloured printing which has been printed on first. Multi-coloured designs are also obtained in this case. Another possibility of carrying out the process according to the invention consists of a procedure in which discharge resist printing pastes which in turn contain dyestuffs which are resistant to alkali are printed onto the ground padded or printed using dyestuffs of the formula I. In this case also, multi-coloured designs are obtained on subsequent fixing and finishing of the textile materials as described above.

The padding liquors or printing pastes contain the dyestuffs of the formula I in a finely dispersed form, as is usual and known for disperse dyestuffs. The padding liquors or printing pastes which are to be employed according to the invention are also prepared in a manner which is in itself known, by mixing the constituents of the liquor or printing paste with the required amount of water and liquid finely dispersed or solid redispersible formulations of the dyestuffs of the formula I.

Disperse dyestuffs which are resistant to alkali and can be combined with the dyestuff of the formula I for producing multi-coloured designs are the known commercial dyestuffs from the group comprising the azo dyestuffs or azomethine dyestuffs, quinophthalone dyestuffs, nitro dyestuffs or anthraquinone dyestuffs. Some examples of disperse dyestuffs which are resistant to alkali are:

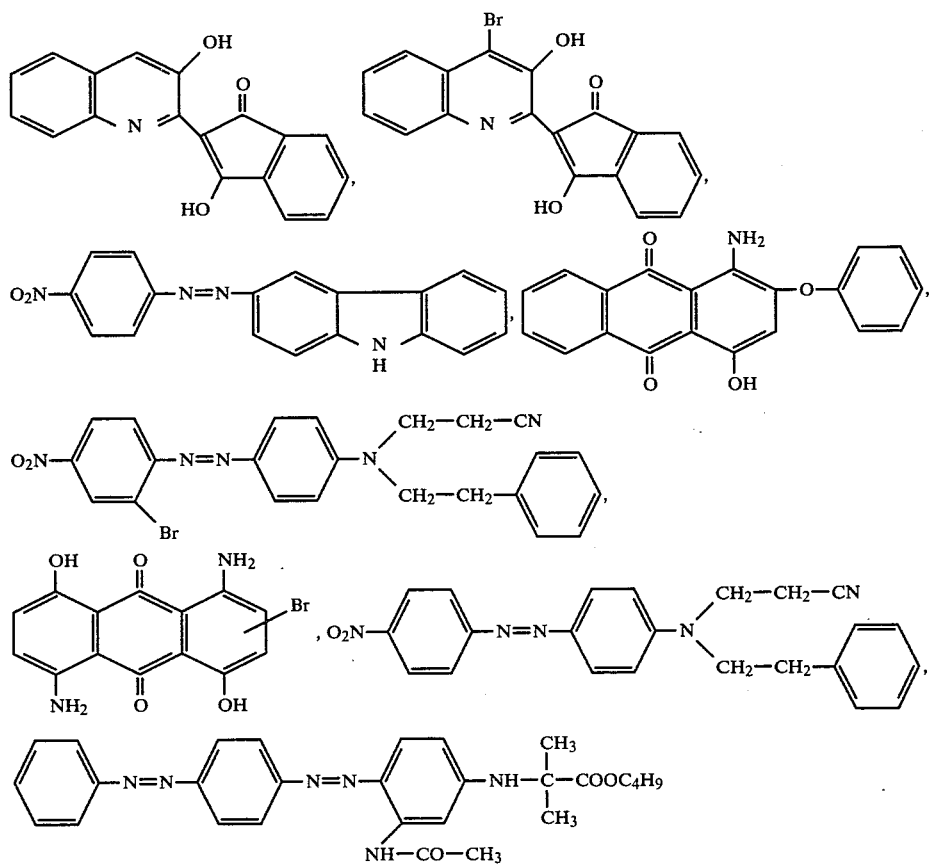

and

-continued

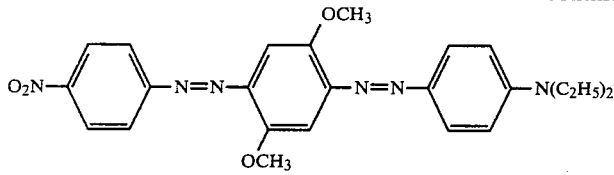

Some of the disperse dyestuffs of the formula I to be employed according to the invention are already known from German Pat. Nos. 1,019,415 and 1,079,758 and French Pat. No. 1,390,146. The dyestuffs not mentioned or included in the above publications can be manufactured, however, by a process completely analogous to the manufacturing processes described therein, by diazotising an amine of the formula II

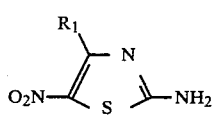

(II)

and coupling the diazotisation product with a coupling component, or a mixture of coupling components, of the formula III

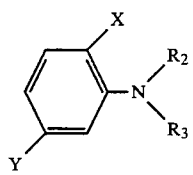

(III)

wherein $R_1$, $R_2$, $R_3$, X and Y have the abovementioned meanings.

The amines of the formula II can be diazotised, for example, as follows:

1 to 1.1 equivalents of an aqueous sodium nitrite solution are added to a solution or suspension of the amine of the formula II in an aqueous strong inorganic acid. It is also possible to dissolve or suspend the amine of the formula II in an organic acid, such as, for example, acetic acid or propionic acid or a mixture of these acids, and to carry out the diazotisation by adding nitrosylsulphuric acid. The resulting solution or suspension of the diazo compound is then combined, at temperatures of $-20°$ to $+30°$ C., preferably $-10°$ to $+10°$ C., with a solution of the coupling component III in water, which contains an acid and/or an organic compound which is partly or completely water-soluble, such as, for example, isobutanol or acetone. Excess nitrous acid is destroyed, if appropriate, by adding sulphamic acid or urea to the coupling solution. When the coupling reaction has ended, which optionally can be facilitated by adding bases, such as, for example, sodium acetate, the dyestuff of the formula I is isolated in the usual manner.

Examples of amines of the formula II which can be used for the manufacture of dyestuffs of the formula I to be employed according to the invention are 2-amino-5-nitro-thiazole, 2-amino-4-methyl-5-nitrothiazole, 2-amino-4-ethyl-5-nitrothiazole, 2-amino-4-n-butyl-5-nitrothiazole, 2-amino-4-n-hexyl-5-nitrothiazole, 2-amino-4-cyano-5-nitrothiazole, 2-amino-4-trifluoromethyl-5-nitrothiazole, 2-amino-4-phenyl-5-nitrothiazole, 2-amino-4-(2'-nitrophenyl)-5-nitrothiazole, 2-amino-4-(4'-nitrophenyl)-5-nitrothiazole, 2-amino-4-(3'-nitrophenyl)-5-nitrothiazole, 2-amino-4-(4'-chlorophenyl)-5-nitrothiazole, 2-amino-4-(2'-bromophenyl)-5-nitrothiazole, 2-amino-4-(2'-chlorophenyl)-5-nitrothiazole, 2-amino-4-(2'-methylphenyl)-5-nitrothiazole and 2-amino-4-(4'-methylphenyl)-5-nitrothiazole. 2-Amino-5-nitrothiazole is particularly preferred.

Processes for the manufacture of aminothiazoles of the formula II have been known for a long time and are described, for example, in German Pat. No. 1,019,415 and German Pat. No. 1,079,758.

Examples of coupling components of the formula III are given in Table 1.

TABLE 1

$$\underset{Y}{\overset{X}{\bigcirc}}-N\overset{R_2}{\underset{R_3}{}} \quad (III)$$

| | X | Y | R₂ | R₃ |
|---|---|---|---|---|
| 1 | H | H | —CH₃ | —CH₃ |
| 2 | H | H | —C₂H₅ | —C₂H₅ |
| 3 | H | H | —C₄H₉(n) | —C₄H₉(n) |
| 4 | H | H | H | —C₃H₇(iso) |
| 5 | H | H | —C₂H₅ | —CH₂—CH₂—OH |
| 6 | H | H | —CH₂—CH₂—OH | —CH₂—CH₂—OH |
| 7 | H | H | H | —CH₂—CH₂—CN |
| 8 | H | H | —CH₂—CH₂—CN | —CH₂—CH₂—CN |
| 9 | H | H | —CH₂—CH=CH₂ | —CH₂—CH=CH₂ |
| 10 | H | H | —CH₂—CH₂—CN | —CH₂—CH=CH₂ |
| 11 | H | H | —C₂H₅ | —CH₂—CH₂—CN |
| 12 | H | H | —CH₂—CH₂—CN | —CH₂—CH₂—O—CO—CH₃ |
| 13 | H | H | —CH₂—CH₂—CN | —CH₂—CH₂—O—CO—CH₂—O—⟨Ph⟩ |
| 14 | H | H | —CH₂—CH₂—CN | —CH₂—CH₂—O—CH₃ |
| 15 | H | H | —CH₂—CH₂—CN | —CH₂—⟨Ph⟩ |
| 16 | H | H | —CH₂—CH₂—CN | —CH₂—CH₂—⟨Ph⟩ |
| 17 | H | H | —(CH₂)₃—OH | —(CH₂)₃—OH |
| 18 | H | H | —CH₂—CH₂—O—CO—CH₃ | —CH₂—CH₂—O—CO—CH₃ |
| 19 | H | H | —CH₂—CH₂—CN | —CH₂—CH₂—O—CO—NH—CH₃ |
| 20 | H | H | —CH₂—CH₂—CN | —CH₂—CH₂—O—CO—NH—⟨Ph⟩ |
| 21 | H | H | —CH₂—CH₂—O—CO—CH₂—CH₂—Cl | —CH₂—CH₂—CN |
| 22 | H | H | —CH₂—CH₂—OH | —CH₂—CH₂—OCH₃ |
| 23 | H | H | —CH₂—CH₂—CN | —CH₂—CH₂—OH |
| 24 | H | H | —CH₂—CH₂—OH | —CH₂—CH₂—O—CO—CH₃ |
| 25 | H | H | —CH₂—CH₂—O—CH₃ | —CH₂—CH₂—O—CO—CH₃ |
| 26 | H | H | —C₂H₅ | —CH₂—CH₂—OCH₃ |
| 27 | H | H | —C₂H₅ | —CH₂—CH₂—OH |
| 28 | H | H | H | —CH₂—CH₂—OH |
| 29 | H | H | —CH₃ | —CH₂—CH₂—OH |
| 30 | H | H | —C₂H₅ | —CH₂—CH₂—Cl |
| 31 | H | H | —C₄H₉(n) | —CH₂—CH₂—OH |
| 32 | H | H | —CH₂—CH₂—OH | —CH₂—CH₂—⟨Ph⟩ |

TABLE 1-continued $$\begin{array}{c} \text{structure (III): cyclohexane with X, Y substituents and } N(R_2)(R_3) \text{ group} \end{array}$$

| | X | Y | R₂ | R₃ |
|---|---|---|---|---|
| 33 | H | H | H | —C₆H₅ (phenyl) |
| 34 | H | H | —C₂H₅ | —CH₂—CH₂—O—CH₂—CH₂—CN |
| 35 | H | H | —CH₂—CH₂—OH | —CH₂—C₆H₅ |
| 36 | H | H | —C₂H₅ | —CH₂—CH—CH₂—Cl<br>      \|<br>      OH |
| 37 | H | H | —C₂H₅ | —CH₂—CH₂—O—CO—CH₂—O—C₆H₅ |
| 38 | H | H | —C₂H₅ | —C₂H₅ |
| 39 | H | H | —CH₂—C₆H₁₁ (cyclohexyl) | —CH₂—CH₂—OH |
| 40 | H | —OCH₃ | —CH₃ | —CH₃ |
| 41 | H | —OC₂H₅ | —CH₃ | —C₂H₅ |
| 42 | H | Cl | —CH₂—CH₂—OH | —CH₂—CH₂—OH |
| 43 | H | Cl | —C₂H₅ | —CH₂—CH₂—CN |
| 44 | H | Cl | —CH₂—CH=CH₂ | —CH₂—CH=CH₂ |
| 45 | H | —CH₃ | —C₂H₅ | —CH₂—CH₂—OH |
| 46 | H | —CH₃ | —CH₂—CH₂—OH | —CH₂—CH₂—OH |
| 47 | H | —C₂H₅ | —C₂H₅ | —CH₂—CH₂—OH |
| 48 | H | —CH₃ | —CH₂—CH₂—OH | —CH₂—CH₂—CN |
| 49 | H | —CH₃ | —CH₂—CH₂—CN | —CH₂—CH₂—CN |
| 50 | H | —CH₃ | —CH₂—CH₂—CN | —CH₂—CH₂—OCH₃ |
| 51 | H | —CH₃ | —CH₂—C₆H₅ | —CH₂—CH₂—OH |
| 52 | CH₃ | H | H | —CH₂—CH₂—OH |
| 53 | H | —CH₃ | —C₂H₅ | —CH₂—CH—CH₂—OH<br>      \|<br>      OH |
| 54 | H | —CH₃ | —CH₂—CH=CH₂ | —CH₂—CH=CH₂ |
| 55 | CH₃ | H | —CH₂—CH=CH₂ | —CH₂—CH=CH₂ |
| 56 | H | —CH₃ | —C₂H₅ | —CH₂—CH₂—O—CO—CH₃ |
| 57 | H | —CH₃ | —CH₂—CH₂—O—CO—CH₃ | —CH₂—CH₂—O—CO—CH₃ |
| 58 | H | —CH₃ | —CH₂—CH₂—CN | —CH₂—CH₂—O—CO—CH₃ |

TABLE 1-continued (III)

| | X | Y | R₂ | R₃ |
|---|---|---|---|---|
| 59 | H | —CH₃ | —C₂H₅ | —CH₂—CH—CH₂—Cl<br>    \|<br>    OH |
| 60 | H | —CH₃ | —CH₃ | —CH₂—CH—OCH₃<br>    \|<br>    OH |
| 61 | H | —C₂H₅ | —C₂H₅ | —CH₂—CH—CH₂—OH<br>    \|<br>    OH |
| 62 | H | —NH—CO—CH₃ | —C₂H₅ | —C₂H₅ |
| 63 | H | —NH—CO—CH₃ | —CH₂—CH=CH₂ | —CH₂—CH=CH₂ |
| 64 | H | —NH—CO—CH₃ | —CH₂—CH₂—CN | —CH₂—CH₂—OH |
| 65 | H | —NH—CO—CH₃ | —CH₂—CH₂—CN | —CH₂—CH₂—O—CO—CH₃ |
| 66 | H | —NH—CO—C₂H₅ | —CH₂—CH₂—OH | —CH₂—CH₂—CO—CO—CH₃ |
| 67 | H | —NH—CO—C₂H₅ | —CH₂—CH₂—O—CO—CH₃ | —CH₂—CH₂—CO—CO—CH₃ |
| 68 | H | —NH—CO—CH₃ | H | —CH₂—CH₂—O—CO—CH₃ |
| 69 | H | —NH—CO—CH₃ | —CH₂—⟨Ph⟩ | —CH₂—CH₂—O—CO—CH₃ |
| 70 | H | —NH—CO—CH₃ | —CH₂—⟨Ph⟩ | —CH₂—CH₂—OH |
| 71 | H | —NH—CO—CH₂—CH₂—Cl | —CH₂—CH₂—OH | —CH₂—CH₂—OH |
| 72 | H | —NH—CO—CH₂—OH | —CH₂—CH₂—CN | —CH₂—CH=CH₂ |
| 73 | H | —NH—CO—⟨Ph⟩ | —CH₂—CH₂—CN | —CH₂—CH₂—O—CO—NH—CH₃ |
| 74 | H | —NH—CO—⟨Ph⟩ | —CH₂—CH₂—CN | —CH₂—CH₂—O—CO—CH₂—O—⟨Ph⟩ |
| 75 | Cl | —NH—CO—CH₃ | —C₂H₅ | —C₂H₅ |
| 76 | Cl | —NH—CO—CH₃ | —CH₂—CH₂—OH | —CH₂—CH₂—OH |
| 77 | Cl | —NH—CO—CH₃ | —CH₂—CH₂—CN | —CH₂—CH₂—O—CO—CH₃ |
| 78 | Cl | —NH—CO—C₂H₅ | —CH₂—CH₂—CN | —CH₂—CH₂—O—CO—CH₃ |
| 79 | Cl | —NH—CO—CH₃ | —CH₂—CH₂—O—CO—CH₃ | —CH₂—CH₂—O—CO—CH₃ |
| 80 | Cl | —NH—CO—CH₃ | —CH₂—CH=CH₂ | —CH₂—CH=CH₂ |
| 81 | CH₃ | —NH—CO—CH₃ | —C₂H₅ | —C₂H₅ |
| 82 | CH₃ | —NH—CO—CH₃ | —CH₂—CH=CH₂ | —CH₂—CH=CH₂ |
| 83 | CH₃ | —NH—CO—C₂H₅ | —CH₂—CH₂—OH | —CH₂—CH₂—OH |
| 84 | CH₃ | —NH—CO—CH₃ | —CH₂—CH₂—CN | —CH₂—CH₂—OH |

TABLE 1-continued (III)

| | X | Y | R₂ | R₃ |
|---|---|---|---|---|
| 85 | CH₃ | —NH—CO—CH₃ | —CH₂—CH₂—CN | —CH₂—CH₂—O—CO—CH₃ |
| 86 | CH₃ | —NH—CO—CH₃ | —CH₂—CH₂—O—CO—CH₃ | —CH₂—CH₂—O—CO—CH₃ |
| 87 | OCH₃ | —NH—CO—CH₃ | —CH₂—CH₂—OH | —CH₂—CH₂—OH |
| 88 | OCH₃ | —NH—CO—CH₃ | —CH₂—CH₂—O—CO—CH₃ | —CH₂—CH₂—O—CO—CH₃ |
| 89 | OC₂H₅ | —NH—CO—CH₃ | —CH₂—CH₂—CN | —CH₂—CH₂—O—CO—CH₃ |
| 90 | OCH₃ | —NH—CO—CH₃ | —CH₂—CH₂—CN | —CH₂—CH₂—O—CO—CH₃ |
| 91 | OCH₃ | —NH—CO—CH₂—OH | —CH₂—CH₂—OH | —CH₃ |
| 92 | OCH₃ | —NH—CO—CH₃ | —CH₂—CH₂—OH | —CH₂—CH₂—CN |
| 93 | OCH₃ | —NH—CO—CH₃ | —CH₂—CH₂—OH | —CH₂—CH₂—CN |
| 94 | OCH₃ | —NH—CO—CH₃ | H | —CH₂—CH=CH₂ |
| 95 | OCH₃ | —NH—CO—CH₃ | H | —CH₂—CH=CH₂ |
| 96 | OCH₃ | —NH—CO—CH₃ | —CH₂—C₂H₅ | —CH₂—CH₂—OH |
| 97 | OCH₃ | —NH—CO—CH₃ | —CH—C₂H₅<br>\|<br>CH₃ | —CH₂—CH₂—O—CO—CH₃ |
| 98 | OCH₃ | —NH—CO—CH₃ | H | —CH(CH₃)(CH₃) |
| 99 | O—CH₂—CH₂—OCH₃ | —NH—CO—CH₃ | H | —C₂H₅ |
| 100 | O—CH₂—CH₂—OCH₃ | —NH—CO—C₂H₅ | H | —C₂H₅ |
| 101 | H | —NH—CO—NH₂ | —C₂H₅ | —C₂H₅ |
| 102 | H | —NH—CO—NH—CH₃ | —CH₂—CH₂—CN | —CH₂—CH₂—OH |
| 103 | H | —NH—CO—NH—CH₃ | —CH₂—CH₂—OH | —CH₂—CH₂—OH |
| 104 | H | —NH—CO—NH—CH₃ | —C₂H₅ | —CH₂—CH₂—O—CO—CH₃ |
| 105 | H | —NH—CO—NH—C₆H₅ | —CH₂—CH₂—O—CO—CH₃ | —CH₂—CH₂—O—CO—CH₃ |

EXAMPLE 1

30 parts of the dyestuff of the formula V

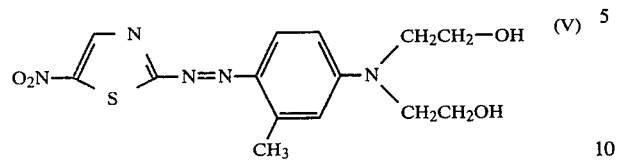 (V)

in a finely divided form are added to a padding liquor which contains, per 1,000 parts, 937 parts of water, 3 parts of monosodium phosphate, 10 parts of sodium chlorate and 20 parts of a polymerisation product based on acrylic acid, as an anti-migration agent. A polyester fabric is padded with this padding liquor using a two-roll padder, squeezed out to a liquor uptake of 60%, and carefully dried at 80°–100° C.; after drying the material, it is over-printed with a printing paste which contains, per 1,000 parts, 600 parts of an aqueous 10% strength carob bean flour ether thickener, 120 parts of water, 80 parts of sodium carbonate, 100 parts of polyethylene glycol 400 and 100 parts of glycerol. After fixing with superheated steam at 175° C. for 7 minutes, reductive after-treatment, soaping, subsequent rinsing and drying, a navy blue print with very good fastness properties, above all good fastness to light, dry heat-setting, rubbing and washing, is obtained. A very good sharply contoured white ground is obtained at the points printed with the printing paste containing sodium carbonate.

EXAMPLE 2

Instead of 30 parts of the dyestuff of Example 1, 20 parts of the dyestuff of the formula VI

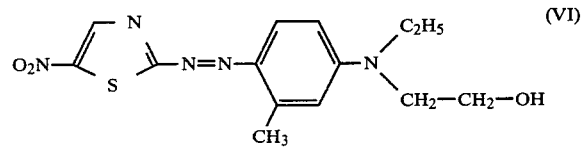 (VI)

are used, and the procedure followed is otherwise as indicated in Example 1. A navy blue print with very good coloristic properties, in particular with good fastness to light, dry heat-setting, rubbing and washing, and, at the discharge points, a very good sharply contoured white ground, is obtained.

EXAMPLE 3

Instead of 30 parts of the dyestuff of the formula V, 20 parts of the dyestuff of the formula VII

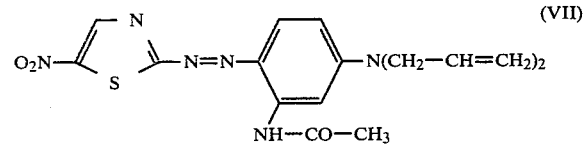 (VII)

are used, and the procedure followed is otherwise as indicated in Example 1. A navy blue print with very good coloristic properties, in particular good fastness to light, heat-setting, rubbing and washing, and, at the discharged points, a very good sharply contoured white ground, is obtained.

EXAMPLE 4

Instead of 30 parts of the dyestuff of the formula V, 30 parts of the dyestuff of the formula VIII

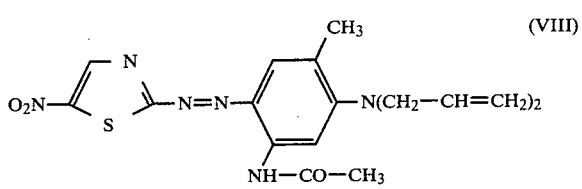 (VIII)

are used, and the procedure followed is otherwise as indicated in Example 1. Navy blue prints with very good coloristic properties, in particular good fastness to light, dry heat-setting, rubbing and washing, and a very good sharply contoured white ground, are obtained.

EXAMPLE 5

Instead of 30 parts of the dyestuff of the formula V, 30 parts of the dyestuff of the formula IX

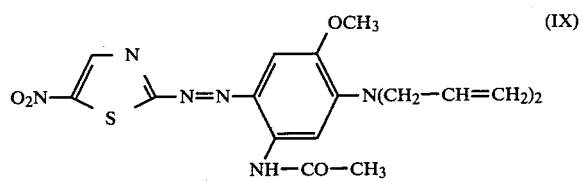 (IX)

are used, and the procedure followed is otherwise as indicated in Example 1. A greenish-tinged blue print with very good coloristic properties, in particular with good fastness to light, dry heat-setting, rubbing and washing, and a very good sharply contoured white ground, is obtained.

If equivalent amounts of the disperse dyestuffs listed in Table 2 are used instead of the disperse dyestuffs of Examples 1 to 5, these other dyestuffs prove outstandingly suitable for the process according to the invention.

TABLE 2

| No. | X | Y | $R_2$ | $R_3$ | Shade |
|---|---|---|---|---|---|
| 6 | hydrogen | methyl | ethyl | 3-chloro-2-hydroxy-prop-1-yl | navy |
| 7 | hydrogen | methyl | methyl | 2-methoxy-2-hydroxy-eth-1-yl | reddish-tinged navy |
| 8 | hydrogen | methyl | ethyl | 2,3-dihydroxy-prop-1-yl | navy |
| 9 | methoxy | acetyl-amino | hydrogen | 2,3-dihydroxy-prop-1-yl | navy |
| 10 | hydrogen | methyl | ethyl | 2-acetoxy-eth-1-yl | reddish-tinged navy |
| 11 | methoxy | acetyl-amino | hydrogen | 2-cyanoeth-1-yl | navy |
| 12 | methoxy | acetyl-amino | 2-cyano-eth-1-yl | 2-hydroxy-eth-1-yl | navy |
| 13 | ethoxy | acetyl-amino | 2-cyano-eth-1-yl | 2-acetoxy-eth-1-yl | navy |

TABLE 2-continued

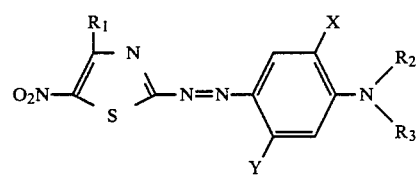

| No. | X | Y | R$_2$ | R$_3$ | Shade |
|---|---|---|---|---|---|
| 14 | methoxy | acetyl-amino | hydrogen | prop-2-yl | greenish-tinged blue |
| 15 | methoxy | acetyl-amino | 2-hydroxy-eth-1-yl | prop-2-yl | green-blue |
| 16 | methoxy | acetyl-amino | 2-acetoxy-eth-1-yl | prop-2-yl | green-blue |
| 17 | methoxy | acetyl-amino | hydrogen | but-2-yl | green-blue |
| 18 | methoxy | acetyl-amino | 2-hydroxy-eth-1-yl | but-2-yl | green-blue |
| 19 | methoxy | acetyl-amino | 2-acetoxy-eth-1-yl | but-2-yl | green-blue |
| 20 | hydrogen | chlorine | 2-hydroxy-eth-1-yl | 2-hydroxy-eth-1-yl | violet |
| 21 | hydrogen | hydrogen | ethyl | ethyl | blue |
| 22 | hydrogen | hydrogen | methyl | 2-hydroxy-eth-1-yl | blue |
| 23 | hydrogen | hydrogen | 2-hydroxy-eth-1-yl | but-1-yl | blue |
| 24 | hydrogen | hydrogen | 2-cyano-eth-1-yl | 2-hydroxy-eth-1-yl | violet |
| 25 | hydrogen | hydrogen | 2-hydroxy-eth-1-yl | 2-hydroxy-eth-1-yl | reddish-tinged blue |
| 26 | hydrogen | methoxy | 2-hydroxy-eth-1-yl | 2-hydroxy-eth-1-yl | blue |
| 27 | methoxy | chlorine | 2-hydroxy-eth-1-yl | 2-hydroxy-eth-1-yl | green |
| 28 | methoxy | methyl | 2-hydroxy-eth-1-yl | 2-hydroxy-eth-1-yl | green |
| 29 | 2-hydroxy-ethoxy | bromine | 2-hydroxy-eth-1-yl | 2-hydroxy-eth-1-yl | blue |
| 30 | hydrogen | methyl | 2-cyano-eth-1-yl | 2-hydroxy-eth-1-yl | reddish-tinged blue |
| 31 | hydrogen | methyl | 2-acetoxy-eth-1-yl | 2-acetoxy-eth-1-yl | violet |
| 32 | hydrogen | acetyl-amino | 2-propion-yl-oxy-eth-1-yl | 2-propion-yl-oxy-eth-1-yl | blue |

We claim:

1. In a process for the production of white patterns or patterns of a different color on a colored background on textile material containing hydrophobic synthetic fibers by impregnating the material with dye liquor which contains a dyestuff which is dischargeable to white in addition to dyeing and padding auxiliaries, drying or superficially drying the material, printing said material in the desired pattern with a discharge resist paste and then subjecting the material to heat treatment at temperatures of 100° to 230° C. wherein the dyestuff which is dischargeable to white is of the formula

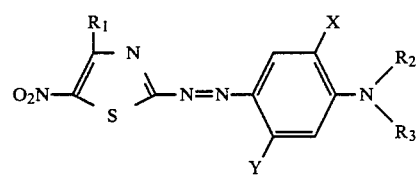

wherein R$_1$ is hydrogen, alkyl with 1 to 6 carbon atoms, cyano, trifluoromethyl or phenyl, which may be unsubstituted or substituted by a substituent selected from the group consisting of chlorine, bromine, nitro and alkyl with 1 to 4 carbon atoms;

X is hydrogen, chlorine, bromine, alkoxy with 1 to 4 carbon atoms, hydroxyalkoxy with 2 to 4 carbon atoms, alkoxyalkoxy with a total of 3 to 6 carbon atoms or alkyl with 1 to 4 carbon atoms unsubstituted or substituted by a substituent selected from the group consisting of chlorine, bromine, cyano and hydroxyl;

Y is hydrogen, chlorine, bromine, alkoxy with 1 to 4 carbon atoms, hydroxyalkoxy with 2 to 4 carbon atoms, alkoxyalkoxy with a total of 3 to 6 carbon atoms, NH—CO—Z, or alkyl with 1 to 4 carbon atoms which is unsubstituted or substituted by a substituent selected from the group consisting of chlorine, bromine, cyano and hydroxyl;

Z is alkyl with 1 to 4 carbon atoms unsubstituted or substituted with a substituent selected from the group consisting of phenyl, chlorine, bromine, cyano, hydroxyl, alkoxy with 1 to 2 carbon atoms, phenoxy, phenyl, amino and N-alkylamino with 1 to 4 carbon atoms;

R$_2$ is hydrogen, alkyl or alkenyl with 1 to 6 carbon atoms which is unsubstituted or substituted by a member selected from the group consisting of chlorine, bromine, cyano, hydroxyl, alkoxy with 1 to 4 carbon atoms, hydroxyalkoxy with 1 to 4 carbon atoms, phenyl, alkanoyloxy with 2 to 4 carbon atoms, alkylaminocarbonyloxy with 2 to 4 carbon atoms, phenylaminocarbonyloxy and hydroxyalkyl with 2 to 4 carbon atoms;

and R$_3$ is phenyl, alkyl or alkenyl with 1 to 6 carbon atoms and said alkyl or alkenyl may be unsubstituted or substituted by a member selected from the group consisting of chlorine, bromine, cyano, hydroxyl, alkoxy and 1 to 4 carbon atoms, hydroxyalkoxy with 1 to 4 carbon atoms, phenyl, alkanoyloxy with 2 to 4 carbon atoms, alkylaminocarbonyloxy with 2 to 4 carbon atoms and hydroxyalkyl with 2 to 4 carbon atoms;

with the proviso that if R$_2$ is hydrogen R$_3$ may also be —C(CH$_3$)$_2$—COOR$_4$ wherein R$_4$ is alkyl with 4 to 8 carbon atoms, methoxyalkyl, ethoxyalkyl or propoxyalkyl with a total of 4 to 8 carbon atoms;

wherein the improvement comprises that said discharge agent is a base which produces a pH of at least 8 in a 5% strength aqueous solution.

2. The process according to claim 1 wherein R$_1$ is hydrogen.

3. The process according to claim 2, wherein Y is methyl, X is hydrogen, R$_2$ is ethyl or β-hydroxyethyl and R$_3$ is β-hydroxyethyl.

4. The process according to claim 1 wherein said dyestuff is selected from the group consisting of

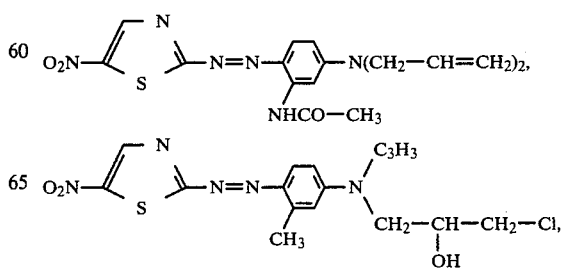

-continued

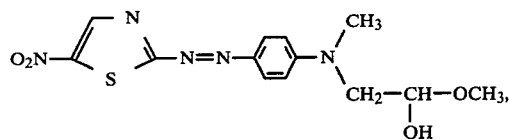

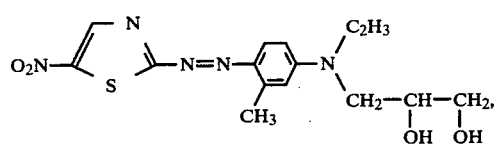

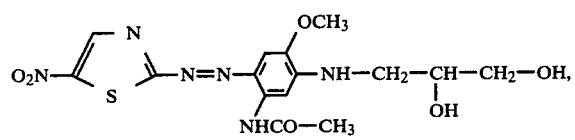

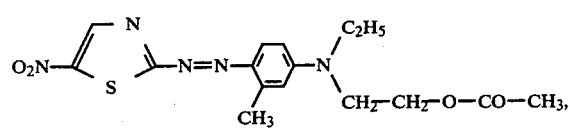

-continued

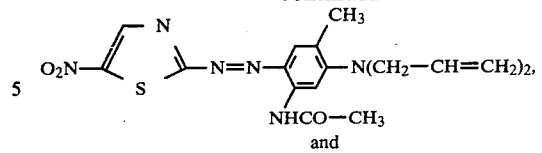

and

5. The process according to claim 1 wherein the dyestuff is a mixture of two or more different dyestuffs defined in claim 1.

6. The process according to claim 1 the base is alkali metal hydroxide, carbonate or bicarbonate.

7. The process according to claim 6 wherein the base is $Na_2CO_3$.

8. A method of printing a textile material containing hydrophobic synthetic fibers comprising applying to said material in the form of a printing paste one or more of the dyestuffs as defined in claim 1, then overprinting with a discharge resist paste in the desired pattern and heating the printed material to 100°–230° C.

* * * * *